United States Patent
Maeda (10) Patent No.: US 10,802,385 B2
(45) Date of Patent: Oct. 13, 2020

(54) PHOSPHOR PLATE, LIGHT SOURCE APPARATUS, AND PROJECTION DISPLAY APPARATUS

(71) Applicant: Panasonic Intellectual Property Management Co., Ltd., Osaka (JP)

(72) Inventor: Makoto Maeda, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/043,313

(22) Filed: Jul. 24, 2018

(65) Prior Publication Data

US 2019/0049828 A1    Feb. 14, 2019

(30) Foreign Application Priority Data

Aug. 8, 2017  (JP) .................. 2017-153365
May 29, 2018  (JP) .................. 2018-102057

(51) Int. Cl.
*G03B 21/20*    (2006.01)
*G02B 5/02*     (2006.01)
*G02B 26/00*    (2006.01)

(52) U.S. Cl.
CPC ......... *G03B 21/204* (2013.01); *G02B 5/0242* (2013.01); *G02B 5/0284* (2013.01); *G02B 26/008* (2013.01); *G03B 21/2066* (2013.01)

(58) Field of Classification Search
CPC .................................................. G03B 21/204
See application file for complete search history.

(56) References Cited

U.S. PATENT DOCUMENTS

| | | | |
|---|---|---|---|
| 2011/0051102 A1 | 3/2011 | Ogura et al. | |
| 2013/0105850 A1* | 5/2013 | Komatsu | H01L 33/505 257/98 |
| 2013/0194777 A1* | 8/2013 | Berben | F21V 13/00 362/84 |
| 2013/0286359 A1* | 10/2013 | Motoya | F21V 9/08 353/31 |
| 2014/0071683 A1* | 3/2014 | Hamada | G03B 21/14 362/259 |

(Continued)

FOREIGN PATENT DOCUMENTS

| | | |
|---|---|---|
| JP | 2007-256876 | 10/2007 |
| JP | 2011-053320 | 3/2011 |

(Continued)

OTHER PUBLICATIONS

New Tipaque News Vo. 1 Titanium Dioxide Pigments: Basic Physical Properties—Tipaque Pigments for Superior Performance & Whiteness, Feb. 2005.

*Primary Examiner* — Michelle M Iacoletti
*Assistant Examiner* — Danell L Owens
(74) *Attorney, Agent, or Firm* — Wenderoth, Lind & Ponack, L.L.P.

(57) ABSTRACT

A phosphor plate includes: a plate substrate, a reflection coating provided on a surface of the plate substrate, a reflecting layer provided on the reflection coating, and composed of metallic oxide and transparent binder, and a phosphor layer provided on the reflecting layer. The reflecting layer has a thickness ranging from 10 μm to 90 μm inclusive, and the metallic oxide is contained in the reflecting layer at a volume density ranging from 15 vol % to 40 vol %.

1 Claim, 10 Drawing Sheets

(56) References Cited

U.S. PATENT DOCUMENTS

2016/0123557 A1    5/2016  Xu et al.
2016/0252722 A1*   9/2016  Li .................... G02B 26/008
                                                          362/84
2016/0266375 A1    9/2016  Li et al.
2016/0353066 A1*  12/2016  Kadowaki ............ H04N 9/3158

FOREIGN PATENT DOCUMENTS

| JP | 2013-228598 | 11/2013 |
| JP | 2016-526191 | 9/2016 |
| JP | 2016-536633 | 11/2016 |

* cited by examiner

PHOSPHOR PLATE, LIGHT SOURCE APPARATUS, AND PROJECTION DISPLAY APPARATUS

BACKGROUND

Technical Field

The present invention relates to a phosphor plate, light source apparatus, and projection display apparatus.

Background Art

A conventional projector has employed a high-pressure mercury lamp as a light source; however, the high-pressure mercury lamp cannot be turned on instantaneously nor has a long service life. Because of, cumbersome maintenance jobs were required. On the other hand, solid state light sources (e.g. semiconductor laser, LED) have been developed recently, and use of those solid state light sources as light sources of image display apparatuses is proposed.

Patent literature 1 (Unexamined Japanese Patent Application Publication No. 2011-53320) discloses the light source apparatus having the following structure: silver reflection coating is provided to a surface of a metal base in order to obtain fluorescence emitted from a phosphor wheel more efficiently than before. This structure allows the fluorescence emitted on the metal base side to reflect at a higher reflectance, so that this fluorescence and fluorescence emitted on an exciting light source side are obtainable at a higher efficiency than before.

Patent literature 2 (Unexamined Japanese Patent Application Publication No. 2013-228598) discloses the light source apparatus in which a method for applying a titanium oxide coating between a metal base and a phosphor layer is employed. This method allows achieving a higher reflectance on a surface of the metal base at a lower cost than before.

SUMMARY

The present disclosure aims to provide a phosphor plate, a light source apparatus, and a projection display apparatus, which allow maintaining a high reflectance of a base, and achieving a high efficiency of converting excitation light to fluorescence while a rise in temperature of a phosphor layer is suppressed.

The phosphor plate of the present disclosure comprises the following structural elements: a plate substrate, a reflection coating provided on the surface of the plate substrate, a reflecting layer provided on the reflection coating, and composed of metallic oxide and transparent binder, and a phosphor layer provided on the reflecting layer. The reflecting layer has a thickness ranging from 10 μm to 90 μm inclusive, and the metallic oxide is contained in the reflecting layer at a volume density ranging from 15 vol % to 40 vol %.

The present disclosure provides the light source apparatus including the phosphor plate discussed above, and the projection display apparatus including the foregoing phosphor plate.

The phosphor plate of the present disclosure allows achieving the light source apparatus in which a rise in temperature of the phosphor layer can be suppressed while the efficiency of converting the excitation light to the fluorescence is maintained at a high level.

EXEMPLARY EMBODIMENTS OF THE PRESENT DISCLOSURE

Exemplary embodiments of the present disclosure are demonstrated hereinafter with reference to the accompanying drawings. Nevertheless descriptions detailed more than necessary will be omitted. For instance, well-known matters will not be detailed, or substantially the same structures will not be described repeatedly. These omissions will avoid redundant descriptions and help the skilled persons in the art understand the present disclosure with ease. The applicant of the present disclosure provides the accompanying drawings and the description below for the skilled persons in the art to fully understand the present disclosure. Nevertheless, these materials will not limit the scope of the claims.

The same structural elements as or similar ones to those in the drawings of the light source apparatus and the projection display apparatus in accordance with the embodiments of the present disclosure have the same or similar reference marks. Nevertheless the drawings are schematic ones, so that dimensional ratios of each element differ from those of the actual ones. The specific dimensions thus shall be determined based on the descriptions below. The dimensional relations or ratios sometimes differ in each one of the drawings.

The embodiments demonstrated below refer to the light source apparatus, as an example of the light source apparatus in accordance with the present disclosure, to be employed in the projection display apparatus, nevertheless, the projection display apparatus is not limited to a device employing the light source apparatus of the present disclosure. For instance, the device can be an illumination apparatus such as a head lamp instead of the projection display apparatus.

First Exemplary Embodiment

The phosphor plate, light source apparatus, and projection display apparatus in accordance with the first embodiment are demonstrated hereinafter with reference to the accompanying drawings.

Figure 1:
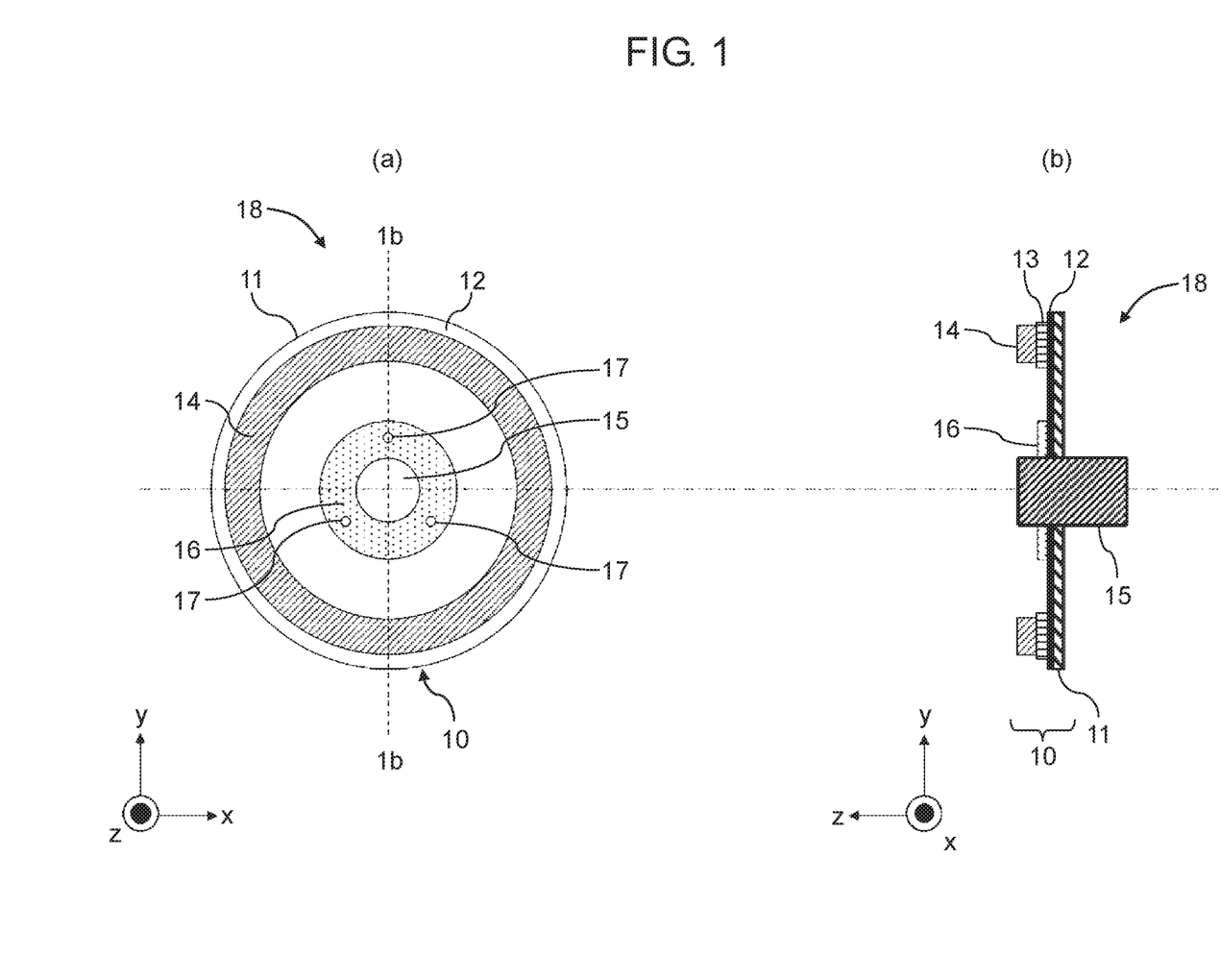
FIG. 1 shows a structure of a phosphor wheel assembly including a phosphor plate in accordance with a first embodiment of the present disclosure.

Structures of the Phosphor Plate, and a Phosphor Wheel Including the Phosphor Plate FIG. 1 shows a structure of phosphor wheel assembly 18 including phosphor plate 10 in accordance with the first embodiment. FIG. 1(a) is a front view of phosphor wheel assembly 18 viewed along +Z line, i.e. input side of excitation light. FIG. 1(b) schematically illustrates the cross section cut along line 1b-1b and viewed along +x line.

As FIG. 1 shows, phosphor plate 10 is formed of disc-shaped plate substrate 11, reflection coating 12 formed on a surface of plate substrate 11, reflecting layer 13 annularly formed on reflection coating 12, and phosphor layer 14 annularly formed on reflecting layer 13. Phosphor wheel assembly 18 is formed by rigidly sandwiching phosphor plate 10, motor 15, and balance plate 16 with three screws 17 via the hub (not shown) of motor 15. Motor 15 drives and rotates the disc-shaped plate substrate 11.

Phosphor plate 10 is rigidly mounted to a housing via a mounting section (not shown) of motor 15, and is controlled by a control section (not shown). Balance plate 16 is made of metallic material and adjusts the rotary balance of phosphor wheel assembly 18 that is expected to rotate. For instance, a part of balance plate 16 is cut for adjusting the balance.

The rotation of phosphor plate 10 by motor 15 allows dissipating the heat supposed to be stored in phosphor layer 14, so that phosphor layer 14 can be cooled.

Plate substrate 11 is a disc-shaped metallic base such as an aluminum base featuring high heat conductivity, being excellent in workability and inexpensive. Reflection coating 12 increases a reflectance of visible light on the surface of plate substrate 11. Reflection coating 12 is formed of, for example, enhanced aluminum reflection coating or dielectric multilayer coating.

Figure 2:
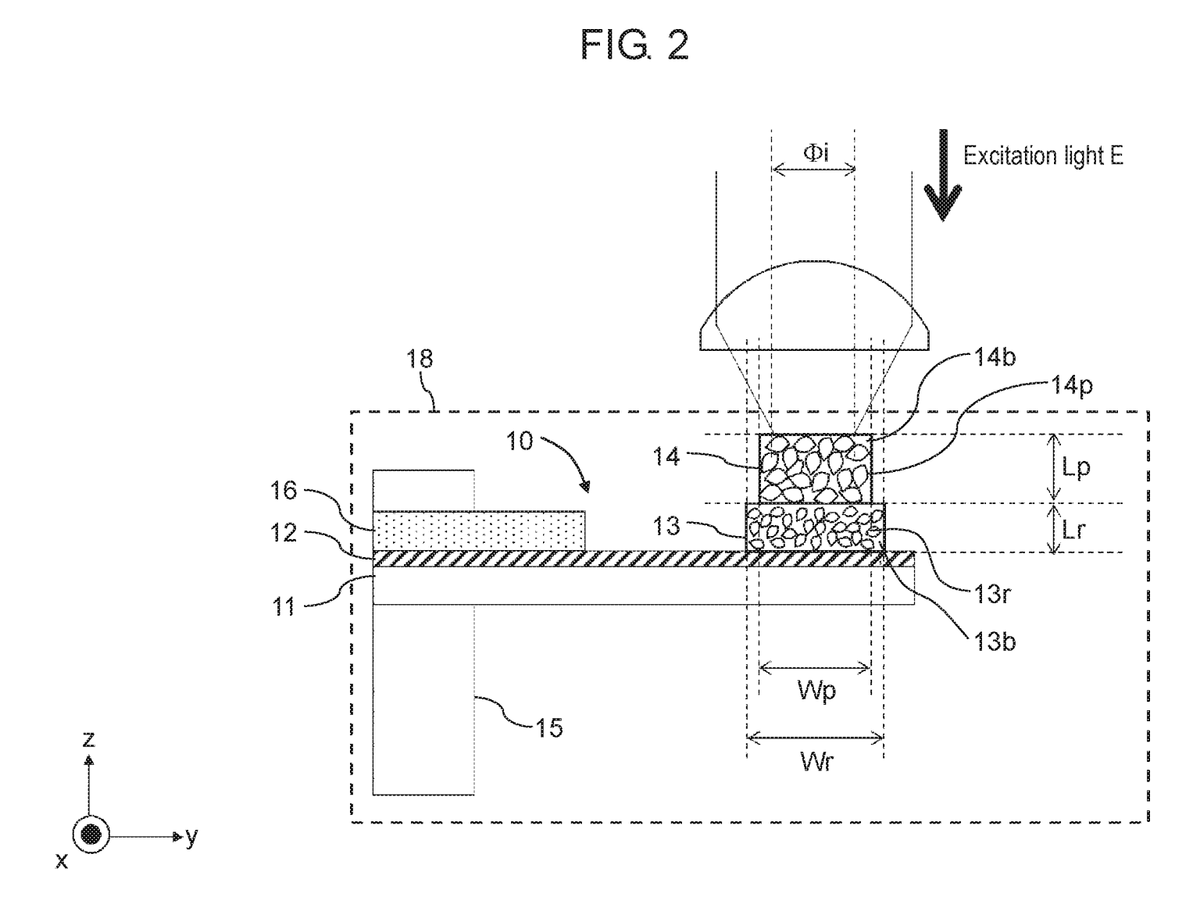
FIG. 2 shows a structure of a reflecting layer and a phosphor layer of the phosphor plate in accordance with the first embodiment.

The structures of reflecting layer 13 and phosphor layer 14 of phosphor plate 10 are described hereinafter with reference to FIG. 2.

Reflecting layer 13 is high reflective paint formed by mixing transparent binder 13b with metallic oxide 13r. This paint is annularly applied on the surface of reflection coating 12, whereby reflecting layer 13 is formed. This highly reflective paint includes metallic oxide 13r having a volume density ranging from 15 vol % to 40 vol %, and most of the remainder of this highly reflective paint is filled with transparent binder 13b. The paint is thus white colored and has high reflectance in the visible light range.

Transparent binder 13b, for example, is silicone resin having a highly visible transmittance and being excellent in heat resistance. Metallic oxide 13r is, for example, titanium oxide having a high refractive index. Reflecting layer 13 obtains reflecting action due to diffusion of light caused by the high refractive index of the titanium oxide; however, use of the titanium oxide having a particle size ranging from 0.15 μm to 0.4 μm is preferable in order to obtain the greater reflecting action.

Phosphor layer 14 is phosphor mixture formed by mixing transparent binder 14b with powder of phosphor 14p, and is provided on the surface of reflecting layer 13 that has been annularly applied on reflection coating 12. The phosphor mixture, i.e. phosphor layer 14, includes phosphor 14p having a volume density of greater than 30 vol %, and emits fluorescence with excitation light E. Phosphor layer 14 emits the fluorescence with the excitation light having even a high light-density as high as equal to 20 W/mm² or greater, so that the particle size of phosphor 14p is greater than that of metallic oxide 13r.

Transparent binder 14b is, for example, silicone resin having a high visible light transmittance and being excellent in heat resistance. Transparent binder 14b forming phosphor layer 14 is preferably formed of the same material as transparent binder 13b of reflecting layer 13. Use of the same transparent binder at both of reflecting layer 13 and phosphor layer 14 will eliminate the difference in the reflectance on the interface between reflecting layer 13 and phosphor layer 14. As a result, light loss due to refraction and reflection on the interface can be reduced. Phosphor 14p is, for example, yellow phosphor Py (e.g. YAG phosphor, $Y_3Al_5O_{12}:Ce_{3+}$) that emits yellow light, of which dominant wavelength is approx. 570 nm, by the excitation of blue light having a wavelength approx. 455 nm. The particle size of yellow phosphor P4 preferably ranges from 20 μm to 30 μm.

The silicone resin is discussed above as an example of the transparent binder; however, other transparent organic materials such as epoxy, or acryl can be used. Other materials including transparent inorganic material formed by melting silicate of soda, glass frit, and ceramic powder can be also used.

The titanium oxide has been discussed previously as an example of the metallic oxide; however, zinc oxide, or zirconium can be also used.

The mixture of the yellow YAG phosphor and the silicone resin has been discussed as an example of the phosphor; however, green LAG phosphor ($Lu_3Al_5O_{12}:Ce_{3+}$), orange-colored or red silicate phosphor can be used, and a ceramic phosphor plate can be also used.

The diffusion reflectance of reflecting layer 13 with respect to the volume density of metallic oxide 13r is described hereinafter with reference to FIG. 3. The volume density in this context refers to a percentage of the volume of metallic oxide contained in the mixture of the metallic oxide and the transparent binder. The diffusion reflectance in this context refers to a total energy of reflection light (=total energy of incident light to the reflecting layer−light energy absorbed into the reflecting layer).

Figure 3:
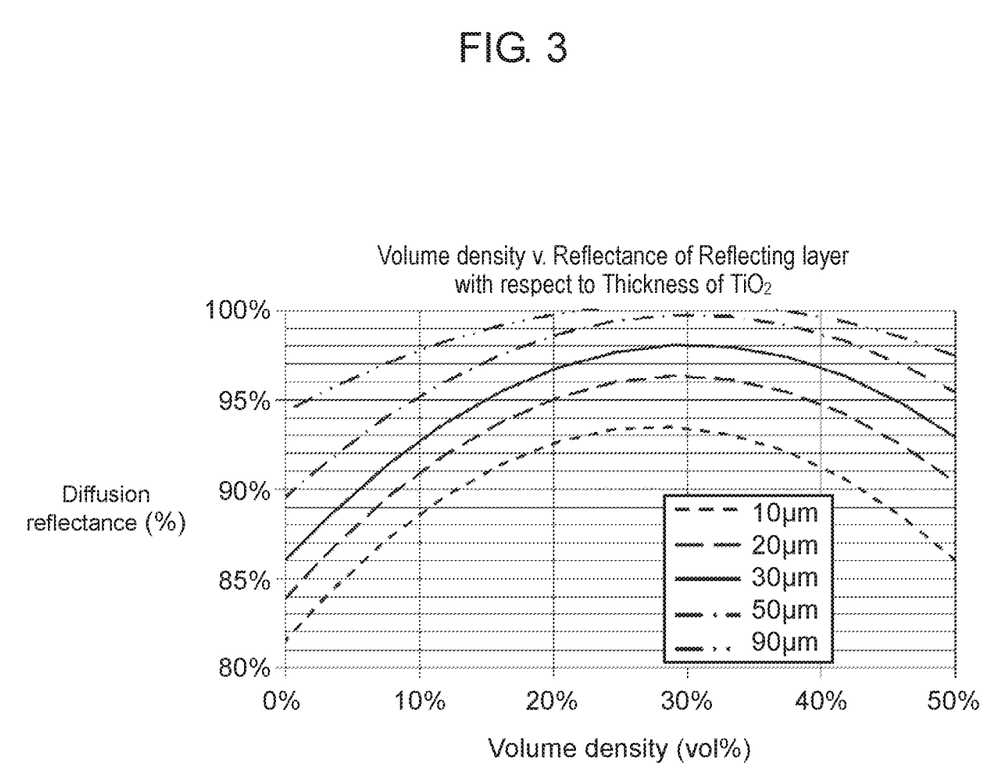
FIG. 3 shows a diffusion reflectance of the reflecting layer with respect to a volume density of the metallic oxide.

FIG. 3 shows the relation between the volume density and the diffusion reflectance of reflecting layer 13 having a thickness ranging from 10 μm to 90 μm in the case of using titanium oxide ($TiO_2$) as metallic oxide 13r. As FIG. 3 proves, at the same volume density, the thicker coating of reflecting layer 13 invites the greater diffusion reflectance in general, and the thinner coating of reflecting layer 13 invites the smaller diffusion reflectance. The coating thickness of reflecting layer 13 in this embodiment is measured through a contact method.

To be more specific, as FIG. 3 illustrates, the diffusion reflectance of reflecting layer 13 draws quadratic curves each having a peak around volume density=30 vol % at any coating thicknesses of reflecting layer 13. At the thicknesses equal to or greater than 30 μm, reflecting layer 13 maintains a high reflectance of 95% or more under the condition of the volume density ranging 15 vol % to 45 vol %. At the thickness equal to 10 μm, reflecting layer 13 maintains sufficiently high reflectance as high as equal to or greater than 90% under the condition of volume density ranging 15 vol % to 40 vol %.

In general, the visible light average reflectance, achieved by enhanced aluminum reflection coating formed on a polished surface of optical glass, is less than 94%. On the other hand, the deposition onto the surface of metal base as shown in the present disclosure tends to invite a reduction in the average reflectance due to the surface roughness. In the reflection coating structure shown in the present disclosure, the coating thickness equal to or greater than 30 μm will allow achieving such a high diffusion reflectance as equal to or greater than 95% at the volume density ranging 15 vol % to 45 vol %. In the case of employing a greater volume density of metallic oxide 13r with respect to transparent binder 13b, since the greater volume density increases the viscosity of the paint, the volume density of 40 vol % is a limit of producing a thin coating stably at a thickness as thin as 90 μm or less of the reflecting layer. The reason why the coating thickness is set to 90 μm or less is that this thickness seems to be an upper limit of the reflecting layer, because diffusion reflectance becomes 100% at the volume density 30 vol %.

The foregoing discussion proves that the volume density of metallic oxide 13r in reflecting layer 13 is preferably set to 15 vol % to 40 vol %.

The structures of reflecting layer 13 and phosphor layer 14 on the surface of reflection coating 12 of phosphor plate 10 are demonstrated hereinafter with reference to FIG. 2. Reflecting layer 13 is adhesively provided onto the surface of reflection coating 12. For instance, reflecting layer 13 is applied onto the surface of reflection coating 12 with a dispenser. Phosphor layer 14 is adhesively provided onto the surface of reflecting layer 13. For instance, phosphor layer 14 is applied onto the surface of reflecting layer 13 with a dispenser.

Assume that reflecting layer 13 has a thickness Lr, and phosphor layer 14 has a thickness Lp, then the relations of Lp>Lr, and Lr≤90 μm are established. Assume that reflecting layer 13 is applied onto phosphor plate 10 at width Wr, phosphor layer 14 has width Wp, and a spot size of an excitation light E on phosphor layer 14 is φi, then the relations of Wr>φi and Wp>φi are established.

Figure 4:
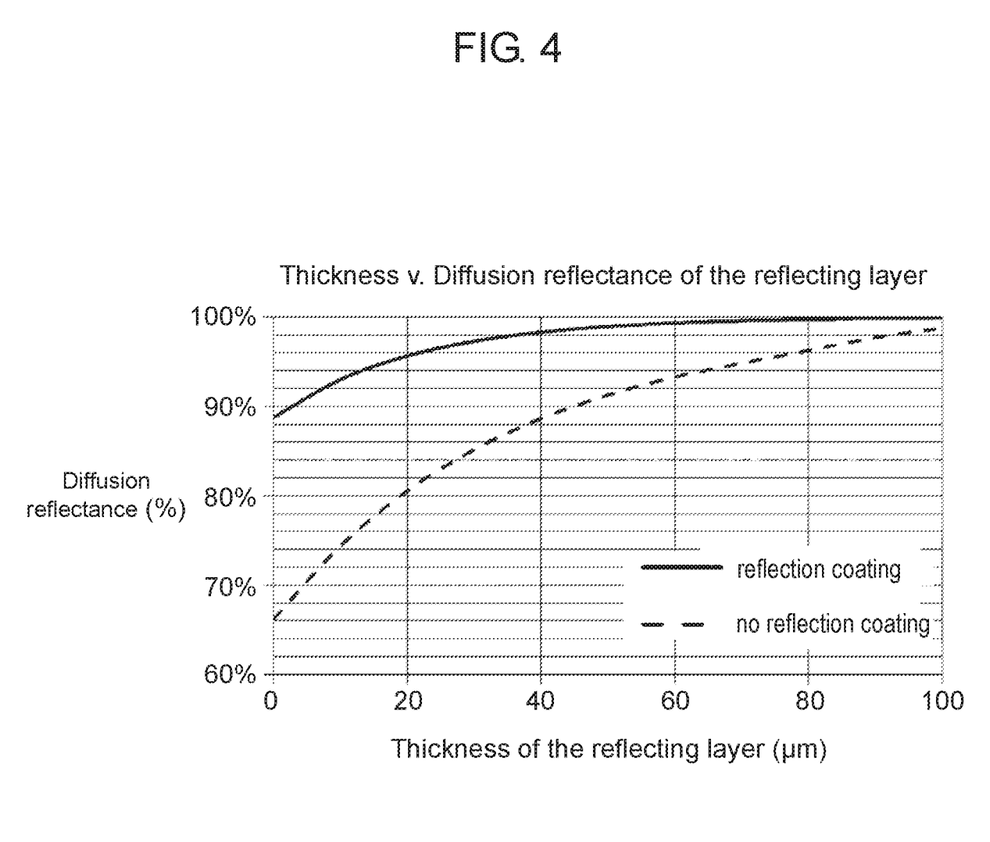
FIG. 4 shows a diffusion reflectance of the reflecting layer with respect to a thickness of the reflecting layer.

The relation between the diffusion reflectance of reflecting layer 13 and the thickness of reflecting layer 13 is described with reference to FIG. 4, which illustrates the relation between the coating thickness and the diffusion reflectance under the condition of employing titanium oxide as metallic oxide 13r at the volume density 30 vol %. The solid line in the graph of FIG. 4 represents the case where plate substrate 11 employs aluminum base, and the enhanced aluminum reflection coating is provided as reflection coating 12 onto the surface of the aluminum base. The broken line represents the case where no reflection coating 12 is provided to the aluminum base (i.e. plate substrate 11). The diffusion reflectance of reflecting layer 13 increases proportionally to the increase in the coating thickness, and in the case of reflection coating being available, the diffusion reflectance becomes equal to or greater than 99% at the thickness equal to or greater than 60 μm, which will result in saturation. The greater volume density leads to the greater diffusion reflectance in general, and the smaller volume density will lead to the smaller diffusion reflectance. As a result, as FIG. 4 illustrates, regarding the coating thickness of reflecting layer 13, in the case of reflection coating 12 being available and coating thickness being equal to or greater than 20 μm, a diffusion reflectance as high as equal to or greater than 95% is obtainable. This mechanism is further detailed hereinafter with reference to FIG. 4.

In the graph shown in FIG. 4, the broken line represents the case where no reflection coating 12 is available, and the solid line represents the case where reflection coating 12 is available. Even if no reflection coating 12 is available, a diffusion reflectance similar to the case where reflection coating 12 is available is obtainable provided that the thickness of the reflecting layer is equal to or greater than 100 μm. However, the greater thickness of reflecting layer 13 leads to the lower efficiency of heat conduction to plate substrate 11, where this heat is generated during an excitation of the fluorescence in phosphor layer 14 formed on reflecting layer 13. The greater thickness thus possibly lowers the luminous efficiency along with a rise in temperature of phosphor layer 14. In other words, reflecting layer 13 having a small heat conductivity works as a heat insulator, thereby adversely preventing phosphor layer 15 from being cooled. To achieve the reflectance equal to or greater than 95%, namely, the reflectance obtained through coating the polished surface of optical glass with enhanced aluminum reflection coating, reflecting layer 13 needs the coating thickness equal to or greater than 80 μm in the case of no reflection coating 12 being available. On the other hand, the coating thickness as thin as 20 μm will achieve the diffusion reflectance equal to or greater than 95% in the case of reflection coating 12 being available. The coating thickness of reflecting layer 13 thus can be reduced from 80 μm to 20 μm, i.e. by 60 μm, so that phosphor layer 14 can be cooled more efficiently.

As discussed above, the volume density of reflecting layer 13 staying within the range of 15 vol % to 40 vol % allows obtaining a sufficiently high diffusion reflectance as high as equal to or greater than 90% even if the thickness of layer 13 is as thin as 10 μm. In the case of thickness equal to or greater than 30 μm, the diffusion reflectance becomes as high as 95%. However, the upper limit of the reflecting layer is 90 μm as discussed previously, so that the thickness of reflecting layer 13 should stay within the range from 10 μm to 90 μm (inclusive) in order to obtain a high diffusion reflectance, and at the same time, the volume density of the metallic oxide contained in the reflecting layer should stay within the range of 15 vol % to 40 vol %. When the volume density of reflecting layer 13 is 30 vol %, the thickness of the reflecting layer is set preferably to the range from 10 μm to 50 μm, namely, 30 μm±20 μm. To be more specific, from the manufacturing view of point, thickness 10 μm is the lower limit of manufacturing the reflecting layers at a uniform thickness, and the upper limit is preferably set to 50 μm at which the reflectance reaches closely to 100%.

Outlines of Light Source Apparatus and Projection Display Apparatus

Figure 5:
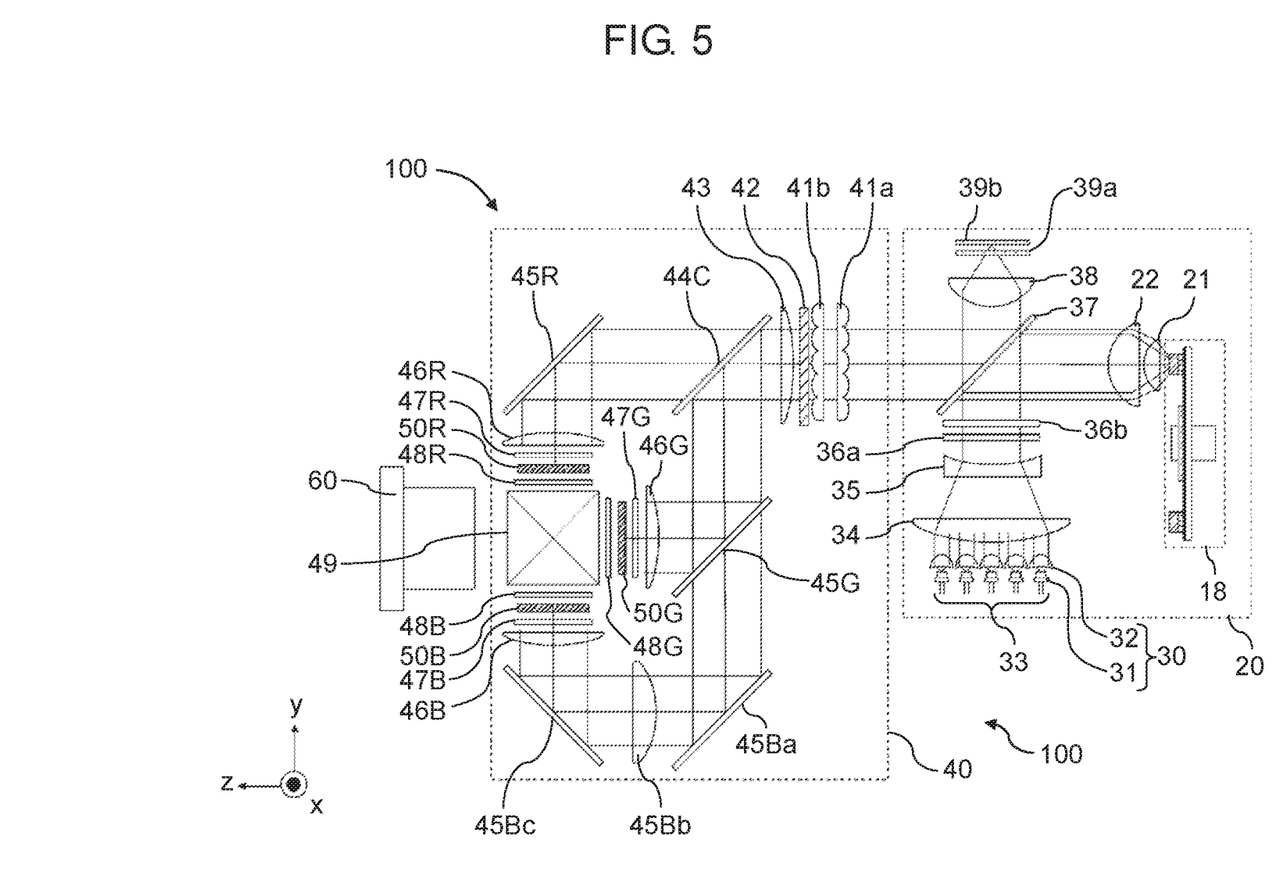
FIG. 5 shows a structure of the light source apparatus and the projection display apparatus in accordance with the first embodiment.

FIG. 5 shows an optical structure of projection display apparatus 100 in accordance with the first embodiment. Projection display apparatus 100 comprises the following structural elements:

light source apparatus 20 emitting reference light (i.e. white light W);

illumination apparatus 40 making the light supplied from light source apparatus 20 uniform, and providing the light with chromatic separation, thereby casting the resulting light on three sheets of LCD (liquid crystal display) panels which work as spatial modulating elements for modulating image light, and then providing the image light with light-composition based on an image signal externally supplied; and projection lens 60 magnifying and projecting the image light, which has undergone the color composition, on a screen.

Projection display apparatus 100 in accordance with the first embodiment thus includes the three sheets of LCD 50 (an example of image modulation element) which modulate the illumination light in response to the image signal.

Structure of Light Source Apparatus

Light source apparatus 20 includes light source 30, which is formed of semiconductor laser 31 (i.e. laser light source) and collimator lens 32. Semiconductor laser 31 is an example of a solid state light source, and light source 30 is an example of an excitation light source.

Semiconductor laser 31 emits blue laser light that has the highest luminous efficiency (e.g. wavelength 455 nm) among the three primary colors R, G, and B. In order for semiconductor laser 31 to generate reference light of high power, multiple semiconductor lasers 31 are arrayed in a matrix pattern, thereby forming array light source 33. This array light source 33 has a heat sink (not shown) on the back side for a forced air-cooling purpose. Collimator lenses 32 disposed on the emittance side of each one of semiconductor laser 31 condense the light emitted from each of laser 31 into roughly parallel lights.

The blue laser light emitted from light source 30 is condensed by converging lens 34 and superposes itself along with the condensation, then concave lens 35 reduces the diameter of the light while the light is roughly parallelized, then diffuser 36a diffuses the resultant light. The light further penetrates through half-wave retarder plate 36b before entering dichroic mirror 37, which transmits a P-polarized blue laser light but reflects an S-polarized blue laser light. The blue laser light emitted from semiconductor laser 31 is specific linearly polarized light, and the half-wave retarder plate 36b rotates the polarization direction of the incident blue laser light (i.e. linearly polarized light). An adjustment of the rotation angle of half-wave retarder plate 36b allows adjusting the polarization direction of the blue laser light entering dichroic mirror 37. As a result, the P-polarized component penetrating through dichroic mirror 37 and S-polarized component reflecting therefrom can be adjusted.

The blue laser light penetrating through dichroic mirror 37 (=P-polarized light) is condensed by lens 38, then penetrates through λ/4 wavelength plate 39a, and reflects from reflecting mirror 39b before penetrating through λ/4 wavelength plate 39a, so that a polarized component of the blue laser light rotates by 90 degrees and turns to S-polarized light, which then enters again and reflects from dichroic mirror 37.

The S-polarized blue laser light reflected from dichroic mirror 37 is condensed by lens 22 and lens 21 onto phosphor layer 14 of phosphor wheel assembly 18. This condensed light works as excitation light E for emitting fluorescence. Excitation light E having entered for exciting phosphor layer 14 generates fluorescence F having a wavelength band different from that of excitation light E. Fluorescence F emitted from phosphor wheel assembly 18 is roughly parallelized by the collimator lens group formed of lens 21 and lens 22, and then enters again dichroic mirror 37. This fluorescence F then is led to illumination apparatus 40 together with the S-polarized blue laser light reflected from dichroic mirror 37. Lens 21 and lens 22 are an example of a light condensing system.

Fluorescence F generated in light source apparatus 20 is yellow light because it is excited by the blue laser light (i.e. excitation light) and emits yellow fluorescence. The blue laser light and yellow fluorescence are superposed together, so that light source apparatus 20 emits white light W.

Entire Structure

White light W emitted from light source apparatus 20 illuminates LCD 50 uniformly with the aid of lens array 41a, lens array 41b, polarization converter 42, and condenser lens 43. White light W emitted from condenser lens 43 is separated by dichroic mirror 44C into red reference light Lr and cyan composited light Lc (green reference light Lg and blue reference light Lb). Then dichroic mirror 45G separates the cyan composited light Lc into green reference light Lg and blue reference light Lb. Lens array 41a, lens array 41b, polarization converter 42, condenser lens 43, and dichroic mirrors 44C, 45G form an illumination optical system.

Red reference light Lr reflects from mirror 45R, then penetrates through lens 46R and input side polarization plate 47R, and is modulated by red LCD 50R into image light, then travels through output side polarization plate 48R, and is led finally to cross dichroic prism 49.

Green reference light Lg is reflected from dichroic mirror 45G, then penetrates through lens 46G and input side polarization plate 47G, and is modulated by green LCD 50G into image light, which then travels through output side polarization plate 48G and is led to cross dichroic prism 49.

Blue reference light Lb travels to mirror 45Ba, penetrates through lens 45Bb, travels to mirror 45Bc, penetrates through lens 46B and input side polarization plate 47B, and is modulated by blue LCD 50l1 into image light, which then travels through output side polarization plate 48B, and is led finally to cross dichroic prism 49.

Blue reference light Lb, green reference light Lg, and red reference light Lr (they are modulated into the image light) are composited by cross dichroic prism 49, and then magnified and projected by projection lens 60 onto a screen (not shown). The spatial modulating elements (i.e. LCD 50 and cross dichroic prism 49) form an image generating section. Projection lens 60 is an example of a projection optical system.

Process of Emission from Phosphor Plate

Figure 6:
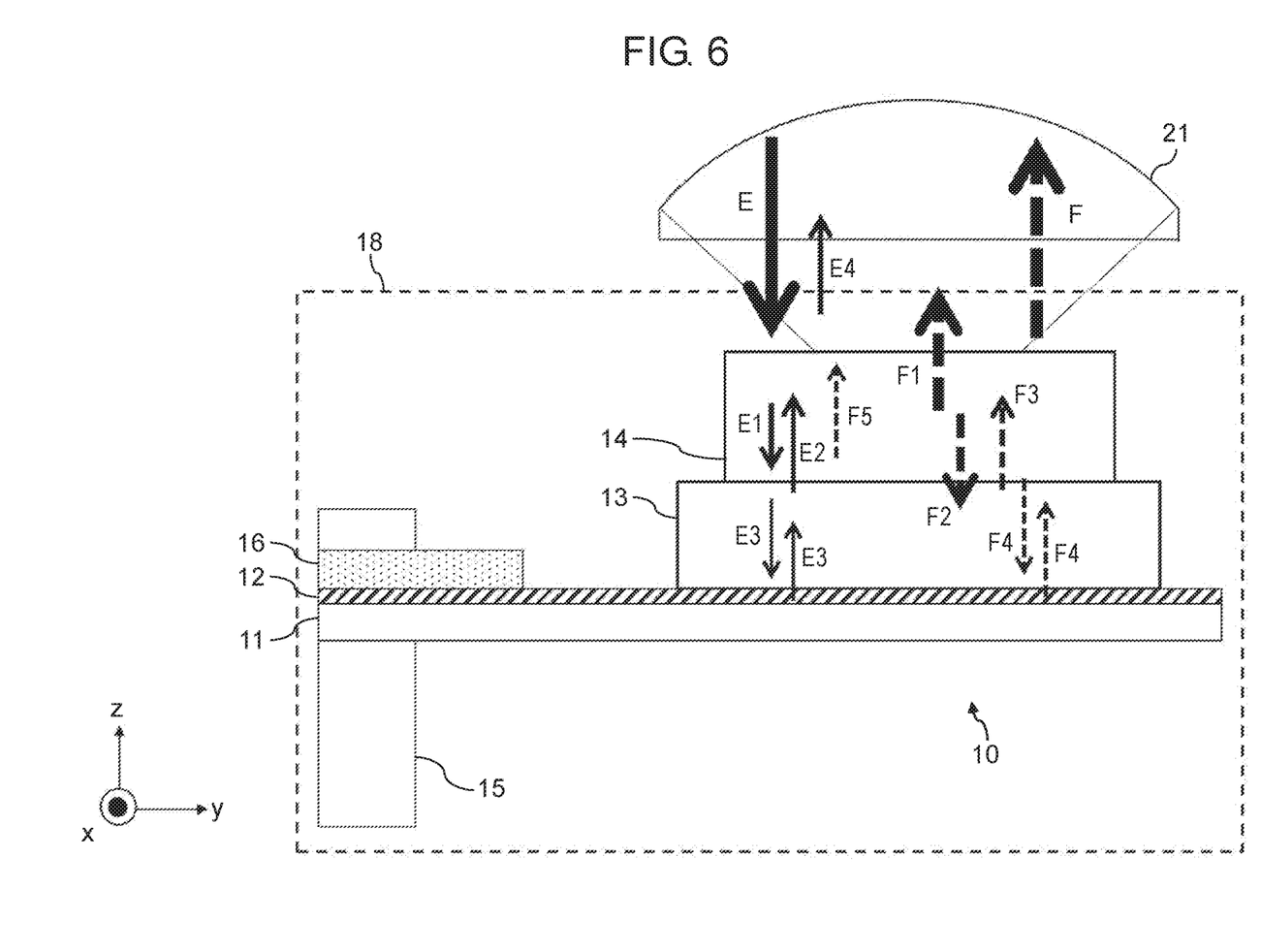
FIG. 6 schematically shows an emitting process of the phosphor plate in accordance with the first embodiment.

FIG. 6 illustrates the process of the emission of fluorescence, viz. excitation light E enters phosphor layer 14, and during the process of penetrating through phosphor layer 14, excitation light E is absorbed in the phosphor contained in phosphor layer 14, thereby emitting fluorescence. Among the omnidirectional emissions of this fluorescence, there are two components, viz. fluorescence F1 traveling toward an input side of excitation light E (i.e. light output side) and fluorescence F2 traveling toward reflecting layer 13 (i.e. incident direction of excitation light E). Fluorescence F2 is divided into two components (i.e. F3 and F4). Fluorescence F3 penetrates through phosphor layer 14, then enters reflecting layer 13, reflects from reflecting layer 13, and then travels to the input side of excitation light E. Fluorescence F4 penetrates through reflecting layer 13, then reflects from reflecting layer 12, and travels to the input side of excitation light E. Among excitation light E, excitation light E1 not absorbed in phosphor layer 14 is divided into E2 and E3. Excitation light E2 penetrates through phosphor layer 14, and reflects from reflecting layer 13. Excitation light E3 penetrates through reflecting layer 13 and reflects from reflection coating 12. Excitation light E2 and excitation light E3 cause the phosphor of phosphor layer 14 to emit light (i.e. fluorescence F5). The component, not absorbed in phosphor layer 14, of excitation light E2 and excitation light E3 emits from phosphor layer 14 as excitation light E4.

Fluorescence F converted by excitation light E is thus expressed as F=F1+F2+F3+F4+F5. Phosphor plate 10 emits fluorescence F4 and excitation light E4 that remains unconverted among excitation light E and emits from phosphor layer 14.

Advantage

In this embodiment, phosphor plate 10 includes reflection coating 12 formed on the surface of plate substrate 11, reflecting layer 13 formed on reflection coating 12, and phosphor layer 14 formed on reflecting layer 13. This structure allows improving the luminous efficiency of fluorescence F with respect to excitation light E, and achieving the higher intensity of the light source apparatus. The presence of reflection coating 12 allows obtaining a sufficient reflectance at a thinner reflecting layer 13, so that the heat generated from phosphor layer 14 can be appropriately discharged to plate substrate 11. As a result, the temperature of phosphor layer 14 can be lowered.

Second Exemplary Embodiment

Figure 7:
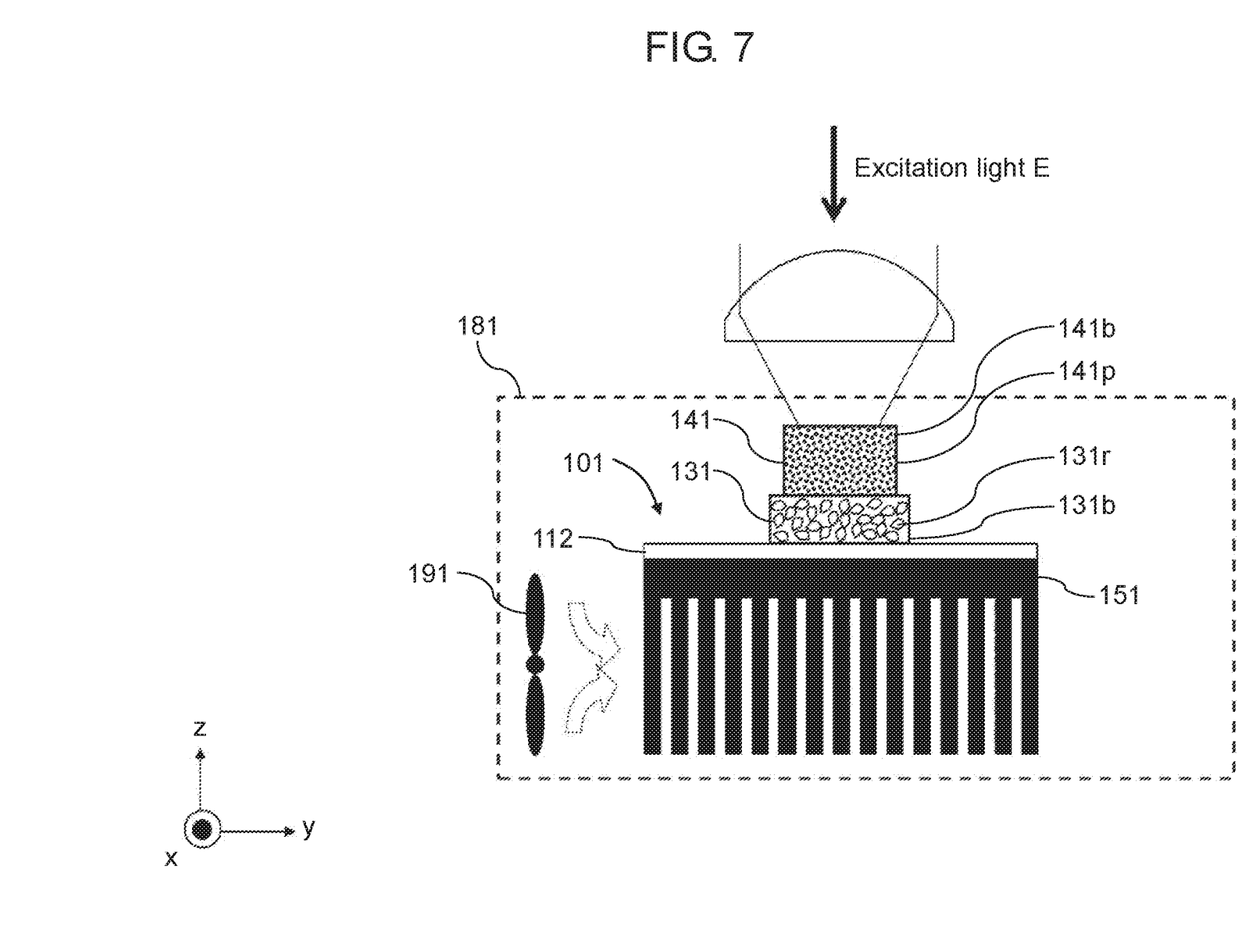
FIG. 7 shows a structure of a phosphor plate assembly in accordance with a second embodiment of the present disclosure.

FIG. 7 shows a structure of a phosphor plate assembly in accordance with the second embodiment. In the description below, structural elements similar to those in FIG. 1 have the same reference marks, and different points from the first embodiment will be chiefly described.

The first embodiment previously discussed has proposed the following structure: A phosphor plate is used in the light source apparatus, and plate substrate 11 employs disc-shaped substrate. This dis-shaped substrate is driven and rotated by motor 15, viz. this is referred to as phosphor wheel assembly 18. In this case, phosphor layer 14 is rotated by motor 15 to be cooled. This second embodiment, on the other hand, employs a fixed type phosphor plate including cooling base plate 151 that also works as a heat sink having a cooling function. Phosphor plate assembly 181 used in this second embodiment can replace phosphor wheel assembly 18 used in the first embodiment.

Structures of Phosphor Plate and Light Source Apparatus

FIG. 7 shows a structure of phosphor plate assembly 181 including phosphor plate 101 in accordance with the second embodiment. FIG. 7 is a lateral drawing viewed along +x line.

As shown in FIG. 7, phosphor plate assembly 181 includes phosphor plate 101 and cooling fan 191. Phosphor plate 101 comprises the following structural elements:
  cooling base plate 151 working as a heat sink for cooling;
  reflection coating 112 provided on a surface of cooling base plate 151; reflecting layer 131 formed on a surface of reflection coating 112 at the center; and
  phosphor layer 141 formed on reflecting layer 131.
A heat-sink structure is formed on cooling base plate 151 at a surface opposite to the surface on which reflection coating 112 is provided, and is subject to forced air-cooling done by cooling fan 191.

Cooling base plate 151 is, for instance, a heat sink produced by an extrusion molding method using aluminum. Reflection coating 112 is, for instance, an enhanced aluminum reflection coating. Cooling base plate 151 is, for instance, a plate substrate.

Reflecting layer 131 is a highly reflective paint produced by mixing transparent binder 131$b$ with metallic oxide 131$r$, and is applied on the surface of reflection coating 112 as adhesive in order to bond phosphor layer 141 thereto. The highly reflective paint, viz. reflecting layer 131, contains metallic oxide 131$r$ at volume density ranging 15 vol % to 40 vol %, and the remainder of layer 131 is filled with almost transparent binder 131$b$. This paint is thus white adhesive having a high reflectance in a visible light range.

Phosphor layer 141 is a ceramic phosphor produced by mixing transparent binder 141 and phosphor 141$p$, and then firing this mixed product. Phosphor layer 141 is bonded onto the surface of reflection coating 112 via reflecting layer 131. The ceramic phosphor, viz. phosphor layer 141, contains phosphor 141$p$ at a volume density equal to or greater than 90 vol %, and emits fluorescence with the excitation by excitation light E. Since this ceramic phosphor can achieve a high luminous efficiency under the condition of intense excitation light, phosphor 141$p$ has a greater particle size than that of metallic oxide 131$r$.

Use of inorganic phosphor layer 141 (i.e. ceramic phosphor) allows conducting or dissipating, at a high heat conductivity, the heat generated during the emission of fluorescence F excited by excitation light E. The heat conductivity of reflecting layer 131, viz. adhesive, can be increased with a higher density of metallic oxide 131$r$ contained in reflecting layer 131, and on top of that, a thinner reflecting layer 131 allows conveying the heat generated in phosphor layer 141 to cooling base plate 151 more efficiently. As a result, phosphor layer 141 can be cooled at a higher efficiency with the cooling effect by cooling fan 191.

Phosphor 141$p$ is, for instance, yellow phosphor Py (e.g. YAG phosphor, $Y_3Al_5O_{12}:Ce_{3^+}$) that emits yellow light excited by blue light having a wavelength approx. 455 nm. This yellow light has a dominant wavelength approx. 570 nm.

Outline of Projection Display Apparatus

Phosphor plate assembly 181 in accordance with the second embodiment can replace phosphor wheel assembly 18 of the projection display apparatus shown in FIG. 5 and in accordance with the first embodiment. Similar to phosphor wheel assembly 18, phosphor plate assembly 181 emits yellow fluorescence, and composites it with blue laser light, thereby forming the light source apparatus, and thereby achieving the projection display apparatus.

Being different from phosphor wheel assembly 18, phosphor plate assembly 181 of the second embodiment includes no motor-driver, so that it is more excellent in noise problem and reliability about vibration.

Third Exemplary Embodiment

Figure 8:
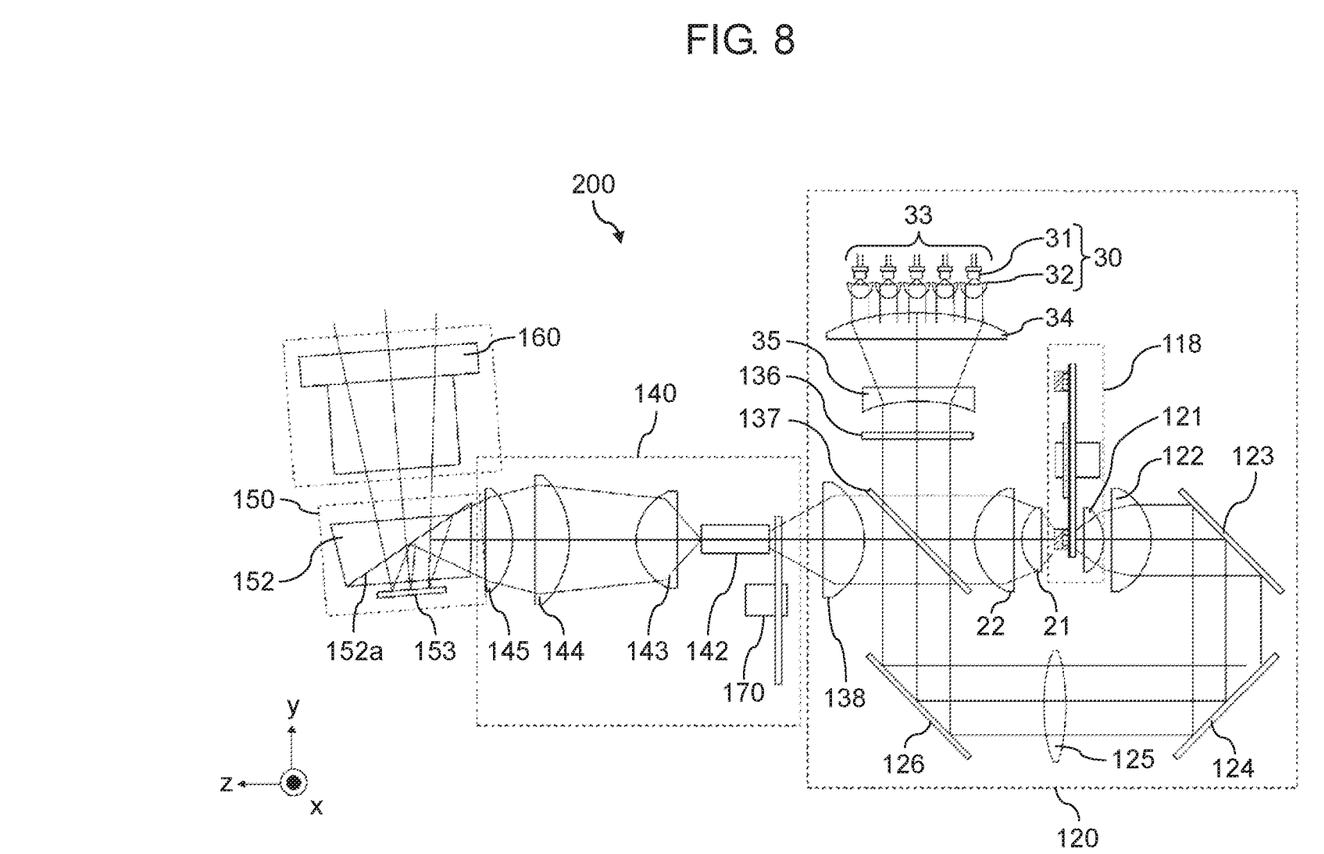
FIG. 8 shows structures of a light source apparatus and a projection display apparatus in accordance with a third embodiment of the present disclosure.

FIG. 8 shows structures of the light source apparatus and the projection display apparatus in accordance with the third embodiment. In the description below, structural elements similar to those in FIG. 5 have the same reference marks, and different points from the first embodiment are chiefly described.

Projection display apparatus 100 shown in FIG. 5 and in accordance with the first embodiment employs three-sheet type LCD projector, viz. three sheets of LCD 50 are used as spatial modulation elements. The white light W produced by light source apparatus 20 is chromatically separated by a color separation optical system of illumination apparatus 40, and each of the separated light is led to each one of spatial modulation elements (i.e. LCD) 50 dedicated to each color. Then the resultant light is chromatically composited again by cross dichroic prism 49, and then the light is projected onto a screen, thereby displaying an image. In the third embodiment illustrated in FIG. 8, one sheet of the spatial modulation element, viz. DMD (Digital Mirror Device) is used. A projector employing this single sheet type DLP® (Digital Light Processing) is demonstrated hereinafter.

Outlines of Light Source Apparatus and Projection Display Apparatus

FIG. 8 shows an optical structure of projection display apparatus 200 in accordance with the third embodiment. Projection display apparatus 200 comprises the following structural elements:
  light source apparatus 120 emitting white light W, viz. reference light;
  illumination apparatus 140 making the light from light source apparatus 120 uniform, chromatically separating the uniformed light, and casting the resultant light on DMD (i.e. spatial modulation element);
  imaging apparatus 150 including the spatial modulation element that modulates the illumination light, in response to an image signal, supplied from illumination apparatus 140, then generates image light of each color of R, G, and B time-divisionally; and projection lens 160 for magnifying and projecting the image light. Projection display apparatus 200 in accordance with this third embodiment includes DMD 153, viz. one sheet of spatial modulation element that modulates the illumination light in response to the image signal.

Structure of Light Source Apparatus

Light source apparatus 120 includes light source 30. Blue laser light emitted from light source 30 is condensed by converging lens 34 and superposed together. Concave lens 35 reduces the diameter of the light, and roughly parallelizes the light. Diffuser 136 diffuses the resultant light, which then enters dichroic mirror 137, which reflects the blue laser light but transmits light in other wavelength bands.

The blue laser light reflected from dichroic mirror 137 is condensed and led, with the aid of lens 22 and lens 21, to phosphor layer 114 (refer to FIG. 9) of phosphor wheel assembly 118 as excitation light E for emitting fluorescence. Excitation light E entering phosphor layer 114 excites phosphor layer 114 of phosphor wheel assembly 118, thereby generating fluorescence F. This fluorescence F has a wavelength band different from that of excitation light E. Fluorescence F emitting from phosphor wheel assembly 118 is roughly parallelized by the collimator lens group formed of lens 21 and lens 22, and enters again dichroic mirror 137, which transmits the resultant fluorescence F, and this fluorescent F is led to illumination apparatus 140. A part of the blue laser light led to phosphor wheel assembly 118 penetrates through wheel assembly 118, and this light is roughly parallelized by the collimator lens group formed of lens 121 and lens 122. This light travels through mirror 123, mirror 124, lens 125, and mirror 126 before reflecting again from dichroic mirror 137, and then is led to illumination apparatus 140. Phosphor wheel assembly 118 will be detailed later. As discussed above, light source 30 working as an excitation light source is disposed such that the excitation light can enter phosphor layer 140 of wheel assembly 118.

Phosphor layer 114 of phosphor wheel assembly 118 emits yellow fluorescence and green fluorescence time-divisionally, and chromatically composites those fluorescent light with the blue laser light penetrating time-divisionally through phosphor wheel assembly 118, thereby allowing light source apparatus 120 to emit time-divisionally yellow light, green light, and blue light.

Fluorescence F and blue laser light emit from light source apparatus 120, and then they are casted by lens 138 on color filter wheel 170 of illumination apparatus 140. Color wheel filter 170 will be detailed later.

The blue laser light and fluorescence F, which is trimmed into a desirable color by color filter wheel 170, emit from wheel 170, and then enter rod integrator 142.

Structure of Projection Display Apparatus

Illumination apparatus 140 comprises the following structural elements:
 color filter wheel 170;
 rod integrator 142;
 lens 143, lens 144, and lens 145.

The light emitted from rod integrator 142 is relayed through lens 143, lens 144, and lens 145, and emits from illumination apparatus 140 before entering imaging apparatus 150.

Imaging apparatus 150 receives the light casted by illumination apparatus 140 for generating an image, and as shown in FIG. 8, it comprises the following structural elements:
 total internal reflection prism 152; and
 one sheet of DMD 153, viz. spatial modulation element (an example of image modulation elements), for modulating incident light based on an image signal externally supplied.

Illumination apparatus 140 is an example of a lighting optical system that leads the outgoing light from the light source apparatus to the image modulation element. Imaging apparatus 150 is an example of the image generating section.

Total internal reflection prism 152 includes face 152a totally reflecting the light, and leads the light supplied from illumination apparatus 140 to DMD 153, which includes multiple movable micro-mirrors. These micro-mirrors are controlled by a control section (not shown) in accordance with the timing of each reference color-light entering DMD 153 and yet in response to image signals entering DMD 153 such that each reference color is modulated with the image signal. The light modulated by DMD 153 penetrates through total internal reflection prism 152 and is led to projection lens 160 (i.e. a projection system), which magnifies and projects the image light composited time-divisionally onto the screen (not shown). Projection lens is an example of the projection optical system.

Structures of Phosphor Wheel and Color Filter Wheel

Figure 9:
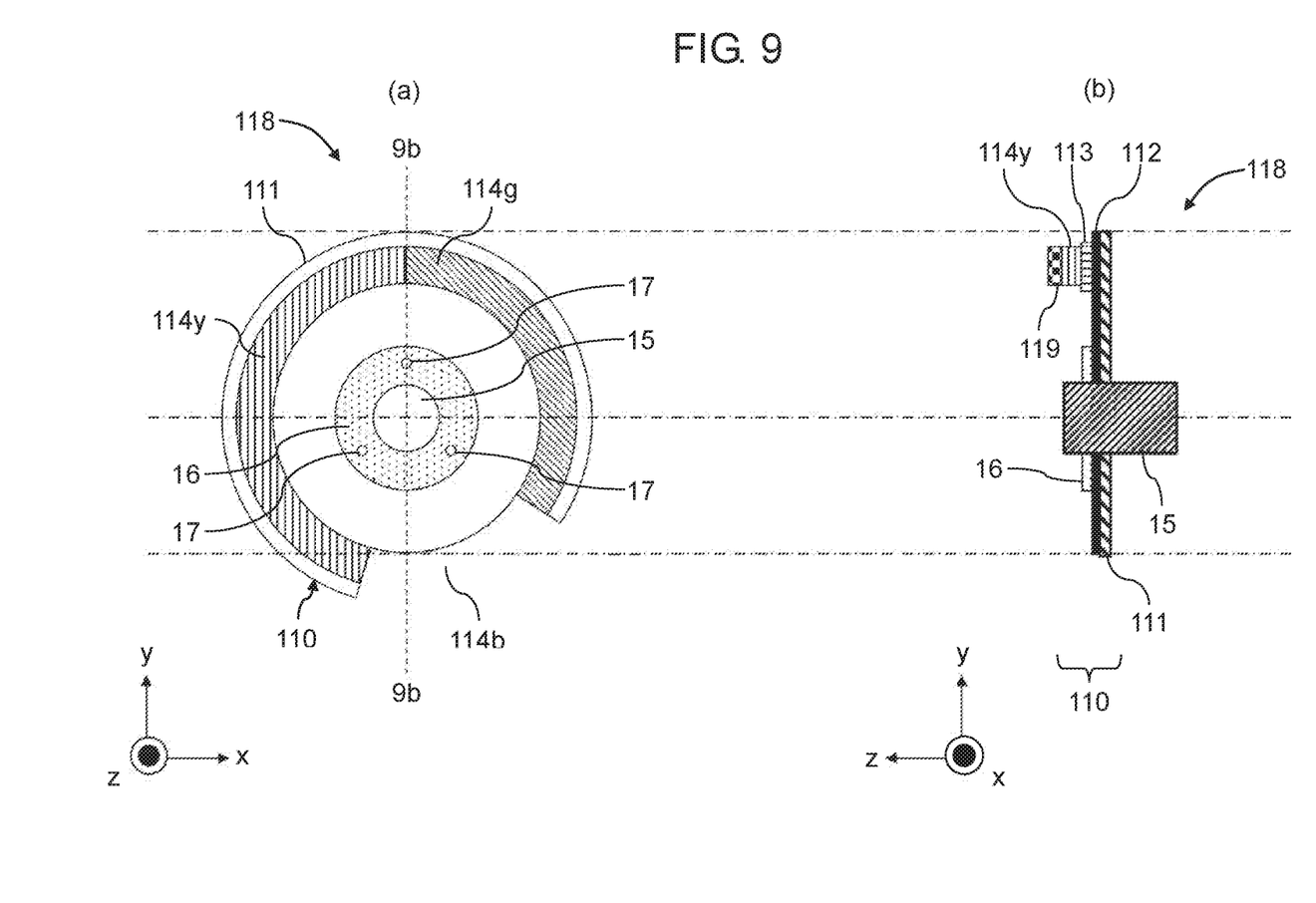
FIG. 9 shows a structure of a phosphor wheel assembly including a phosphor plate in accordance with the third embodiment.

A structure of phosphor wheel assembly 118 is demonstrated hereinafter with reference to FIG. 9. FIG. 9(a) is a front view of phosphor plate 110 viewed along +z line of FIG. 9, and FIG. 9(b) is a schematic sectional view cut along line 9(b)-9(b) in FIG. 9(a) for illustrating the cross section. In FIG. 9, similar structural elements to those in FIG. 1 have the same reference marks, and the descriptions thereof are omitted here.

In this third embodiment, plate substrate 111 differs in the shape from disc-shaped plate substrate 11 used in the first embodiment. Plate substrate 111 forms roughly a disc shape having cutout region 114b, and includes reflection coating 112 on the surface. Reflecting layer 113 is provided on the surface of reflection coating 112 in an annular shape and a fan shape, and not provided on the cutout region 114b. As shown in FIG. 9(a), phosphor layer 114y and phosphor layer 114g (these two layers are referred to as phosphor layer 114 integrally) are provided on reflecting layer 113 in fan shapes.

Phosphor layer 114y includes a phosphor which emits yellow light having a dominant wavelength approx. 570 nm with the excitation by the blue light having a wavelength approx. 455 nm. This phosphor is applied onto plate substrate 111 at a part of the annular shape in a fan shape. This annular shape is centered at a rotation center of plate substrate 111.

Phosphor layer 114g includes a phosphor which emits green light having a dominant wavelength approx. 550 nm with the excitation by the blue light having a wavelength approx. 455 nm. This phosphor is applied onto plate substrate 111 at a part of the annular shape in a fan shape. This annular shape is centered at a rotation center of plate substrate 111.

Phosphor layer 114y is formed by applying yellow phosphor Py, via the transparent binder, to the surface of reflecting layer 113 of plate substrate 111. Phosphor layer 114g is formed by applying green phosphor Pg, via the transparent binder, to the surface of reflecting layer 113 of plate substrate 111.

Yellow phosphor Py employs, for instance $Y_3Al_5O_{12}$:$Ce_{3+}$, and green phosphor Pg employs, for instance, $Lu_3Al_5O_{12}$:$Ce_{3+}$. The transparent binder employs, for instance, silicone resin.

Cutout region 114b of plate substrate 111 has no plate substrate 111, or no phosphor layer 114, so that excitation light E (i.e. blue laser light) casted can travel through cutout region 114b without changing the wavelength.

On the surface of phosphor layer 114, low refractive index layer 119 is provided. This layer 119 has a lower refractive index than the phosphor layer, and decreases the difference in refractive index between the air and phosphor layer 114, thereby reducing surface reflection of excitation light E entering phosphor layer 114. As a result, a capturing efficiency of the excitation light can be improved. Low refractive index layer 119 reduces interface reflection of fluorescence F outgoing from phosphor layer 114, so that a light output efficiency from phosphor layer 114 can be improved.

Low refractive index layer 119 is generally a transparent paint forming a coating having a thickness ranging 50 nm to 200 nm, and contains hollow silica at a volume density equal to or greater than 90 vol %. Low refractive index layer 119 is made by mixing, for instance, transparent binder such as silicone resin with particles of lower refractive index than that of the transparent binder. Low refractive index layer 119 can be, for instance, an AR evaporated coating (dielectric multilayer coating) to be used as antireflection coating.

Figure 10:
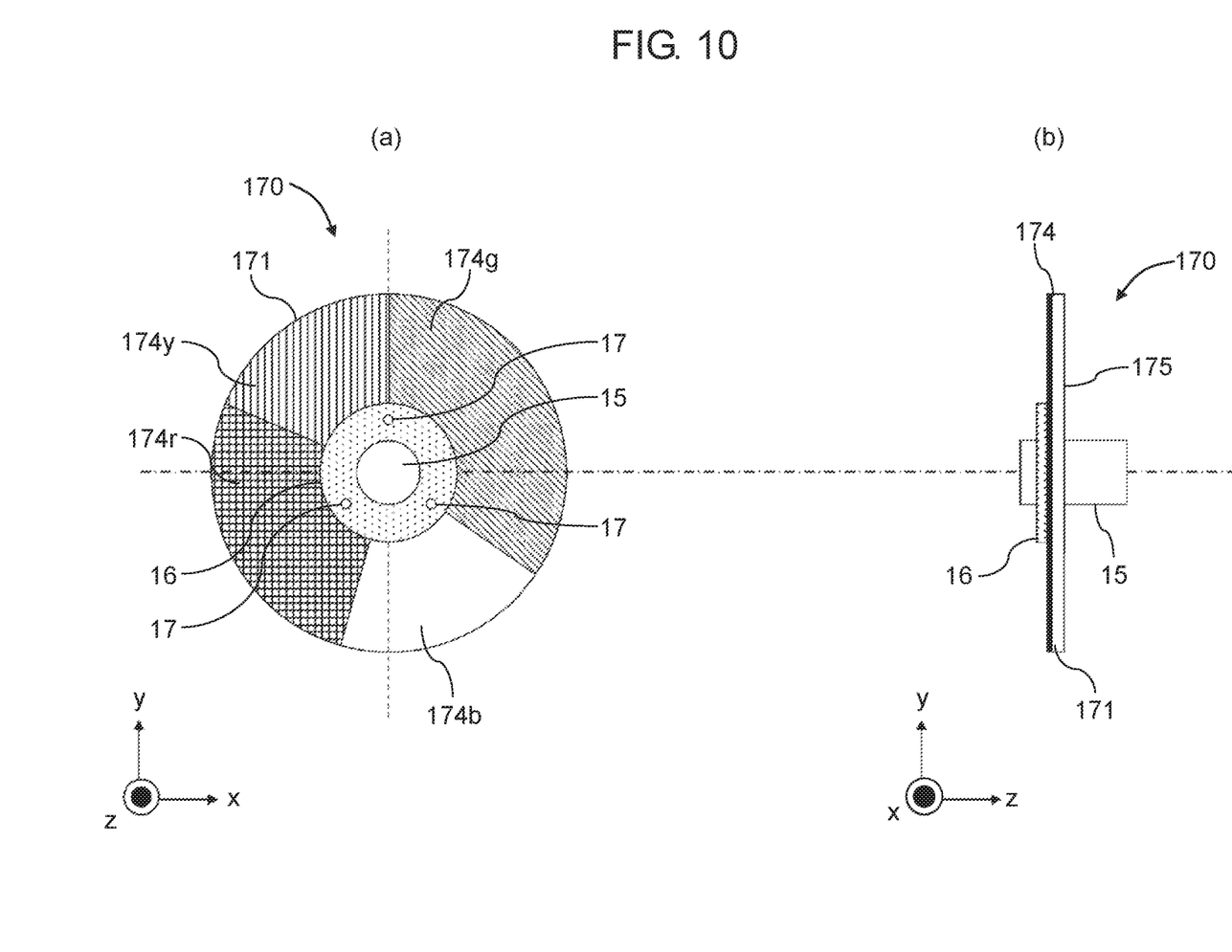
FIG. 10 shows a structure of a color wheel assembly in accordance with the third embodiment.

A structure of color filter wheel 170 is demonstrated hereinafter with reference to FIG. 10. FIG. 10(a) is a front view of color filter wheel 170 viewed along +Z line, and FIG. 10(b) is a lateral view of color filter wheel 170 viewed along +x line.

Color filter wheel 170, as shown in FIG. 10(b), includes transparent substrate 171, motor 15, balance plate 16, and screws 17. Motor 15 drives and rotates disc-shaped transparent substrate 171, and is controlled by a control section (not shown) for driving substrate 171. For instance, transparent substrate 171 is connected to motor 15 with the hub of motor 15. Balance sheet 16 and screws 17 are provided similarly to those of phosphor wheel assembly 118.

Transparent substrate 171 is a disc-shaped transparent substrate, and made of glass substrate transparent across the visible range.

Transparent substrate 171 has dichroic coating 174 on the light incident face, which reflects some incident light having a certain wavelength band, and transmits the light of desirable wavelength region in order to obtain desirable color light. This dichroic coating 174 is formed of color filters 174g, 174y, 174r, and 174b. Transparent substrate 171 includes antireflection coating 175 on the light outgoing face. Dichroic coating 174 (color filters 174g, 174y, 174r, and 174b are referred to integrally as dichroic coating 174) is an example of a reflection coating of the color filter.

The blue laser light, viz. excitation light E, excites phosphor layer Py to generate yellow fluorescence Fy, and excites phosphor Pg to generate green fluorescence Fg, and the fluorescence reflects and emits. The blue laser light penetrates through cutout region 114b.

As shown in FIG. 10(a), color filter 170 has four segments: the first one is color filter 174g formed of dichroic coating, which is highly transmissive in a visible wavelength region longer than 480 nm, and highly reflective in a visible wavelength region equal to or shorter than 480 nm. The second region is color filter 174y formed of dichroic coating, which is highly transmissive in the visible wavelength region longer than 480 nm, and highly reflective in the visible wavelength region equal to or shorter than 480 nm. The third segment is color filter 174r formed of dichroic coating, which is highly transmissive in a visible wavelength region longer than 600 nm, and highly reflective in a visible wavelength region equal to or shorter than 600 nm. The fourth segment is transmissive region 174b, which is AR coating, viz. antireflection coating.

To be more specific, color filters 174g, 174y, 174r perform 'trimming', viz. reflecting the light in a part of the wavelength band, thereby cutting this light, and transmitting the light in a desirable wavelength band for obtaining desirable color light.

Phosphor wheel assembly 118 and color filter wheel 170 are controlled such that they rotate at the same rpm. In other words, color filter wheel 170 is controlled such that the four segments discussed above carry out one rotation in a time corresponding to one frame (e.g. 1/60 second).

The rotation of phosphor wheel assembly 118 is adjusted such that yellow fluorescence Fy emitting from phosphor layer 114y can enter color filter 174y and color filter 174r of color filter wheel 170. Therefore, the angle of phosphor layer 114y is set to equal to the sum of an angle of color filter 174y and an angle of color filter 174r.

When yellow fluorescence Fy emitting from phosphor layer 114y penetrates through color filter 174y, color filter 174y reflects visible light having a wavelength equal to or shorter than 480 nm and transmits visible light having a wavelength longer than 480 nm, thereby generating yellow reference light Ly. When yellow fluorescence Fy emitting from phosphor layer 114y penetrates through color filter 174r, color filter 174r reflects visible light having a wavelength equal to or shorter than 600 nm and transmits visible light having a wavelength longer than 600 nm, thereby generating red reference light Lr.

The rotation of phosphor wheel assembly 118 is adjusted such that green fluorescence Fg emitting from phosphor layer 114g can enter color filter 174g of color filter wheel 170. Therefore, the angle of phosphor layer 114g is set to equal to an angle of color filter 174g. When green fluorescence Fg emitting from phosphor layer 114g penetrates through color filter 174g, color filter 174g reflects visible light having a wavelength equal to or shorter than 480 nm and transmits visible light having a wavelength longer than 480 nm, thereby generating green reference light Lg.

The rotation of phosphor wheel assembly 118 is adjusted such that excitation light E penetrating through cutout region 114b can enter transmissive region 174b of color filter wheel 170. An angle of cutout region 114b is thus set to equal to an angel of transmissive region 174b. Excitation light E penetrating through transmissive region 174b generates blue reference light Lb.

Advantage

The presence of the low refractive index layer discussed in this third embodiment allows improving the capturing efficiency of the excitation light, and also improving the fluorescence output efficiency. As a result, use of the structure in accordance with the third embodiment allows increasing the intensity of the light source apparatus, and improving the cooling efficiency for reducing heat generation caused by the fluorescence not output externally.

INDUSTRIAL APPLICABILITY

The present disclosure relates to the phosphor plate excited by the light source apparatus using the excitation light source, and is applicable to projection display apparatuses.

What is claimed is:
1. A phosphor plate comprising:
a plate substrate;
a reflection coating provided on a surface of the plate substrate;
a reflecting layer provided on the reflection coating, and composed of metallic oxide and transparent binder;

a phosphor layer provided on the reflecting layer; and a low refractive index layer provided on the phosphor layer, the low refractive index layer having a refractive index lower than a refractive index of the phosphor layer, wherein the reflecting layer has a thickness ranging from 10 μm to 90 μm inclusive, and the metallic oxide is contained at a volume density ranging from 15 vol % to 40 vol % in the reflecting layer; and wherein the low refractive index layer contains particles, having a lower refractive index than a refractive index of the transparent binder, at a volume density equal to or greater than 90 vol %, and forms a coating having a thickness ranging from 50 nm to 200 nm.

* * * * *